(12) United States Patent
Habrich et al.

(10) Patent No.: US 11,187,713 B2
(45) Date of Patent: Nov. 30, 2021

(54) LABORATORY MODULE FOR STORING AND FEEDING TO FURTHER PROCESSING OF SAMPLES

(71) Applicant: STRATEC Biomedical AG, Birkenfeld (DE)

(72) Inventors: Stephan Habrich, Birkenfeld (DE); Martin Trump, Birkenfeld (DE)

(73) Assignee: STRATEC SE, Birkenfeld (DE)

(*) Notice: Subject to any disclaimer, the term of this patent is extended or adjusted under 35 U.S.C. 154(b) by 0 days.

(21) Appl. No.: 14/298,656

(22) Filed: Jun. 6, 2014

(65) Prior Publication Data

US 2014/0287515 A1 Sep. 25, 2014

Related U.S. Application Data

(63) Continuation-in-part of application No. 14/154,860, filed on Jan. 14, 2014, now abandoned.

(30) Foreign Application Priority Data

Jan. 14, 2013 (GB) ..................................... 1300606

(51) Int. Cl.
*G01N 35/04* (2006.01)
*G01N 35/00* (2006.01)

(52) U.S. Cl.
CPC ....... *G01N 35/04* (2013.01); *G01N 35/00732* (2013.01); *G01N 2035/00752* (2013.01); *G01N 2035/0413* (2013.01); *G01N 2035/0425* (2013.01); *G01N 2035/0496* (2013.01); *G01N 2035/0498* (2013.01); *Y10T 436/113332* (2015.01)

(58) Field of Classification Search
CPC .... G01N 21/07; G01N 35/0092; G01N 21/51; G01N 35/00
USPC ........................... 435/287.1; 436/43; 422/67
See application file for complete search history.

(56) References Cited

U.S. PATENT DOCUMENTS

| | | | |
|---|---|---|---|
| 5,417,922 A | 5/1995 | Markin | |
| 6,068,437 A * | 5/2000 | Boje | ...................... B65G 1/127 198/346.2 |
| 2003/0215357 A1 | 11/2003 | Malterer | |

(Continued)

FOREIGN PATENT DOCUMENTS

| EP | 1391401 | 2/2004 |
|---|---|---|
| EP | 1391402 | 2/2004 |

*Primary Examiner* — Rebecca M Fritchman
(74) *Attorney, Agent, or Firm* — 24IP Law Group USA< PLLC; Timothy R DeWitt

(57) ABSTRACT

A laboratory module for storing and providing access to a plurality of samples, the laboratory module comprising a plurality of bays comprising a plurality of guiding rails and a plurality of rack tray bays for accommodating a plurality of rack trays, and a transport chamber for transporting at least one sample rack to a storage location and for delivering at least one sample rack at predetermined times to a processing system. The transport chamber is adapted to align with any one of the plurality of guiding rails, comprised in the bays and in the rack trays, for placing and moving on the guiding rails the at least one sample rack, and a sensor for sensing the presence and location of a sample rack on any one of the guiding rails, and a barcode scanner that identifies the sample rack and a storage device for storing data.

14 Claims, 13 Drawing Sheets

(56) References Cited

U.S. PATENT DOCUMENTS

| | | |
|---|---|---|
| 2003/0215361 A1 | 11/2003 | Jang |
| 2004/0256963 A1 | 12/2004 | Affleck |
| 2008/0113440 A1* | 5/2008 | Gurney .................. G01N 1/312 436/48 |
| 2013/0244241 A1* | 9/2013 | Carrera Fabra ........ C12M 23/42 435/6.12 |
| 2014/0170735 A1* | 6/2014 | Holmes ...................... 435/287.1 |

* cited by examiner

LABORATORY MODULE FOR STORING AND FEEDING TO FURTHER PROCESSING OF SAMPLES

CROSS-REFERENCE TO RELATED APPLICATIONS

The present application is a continuation-in-part of U.S. patent application Ser. No. 14/154,860, entitled "Laboratory Module For Storing And Feeding To Further Processing Of Samples" and filed by the present inventors on Jan. 14, 2014.

The aforementioned provisional patent application is hereby incorporated by reference in its entirety.

BACKGROUND OF THE INVENTION

Field of the Invention

The invention relates to a laboratory module and to a method for storing and feeding to further processing of at least one sample.

Brief Description of the Related Art

The preparation and analysis of samples is being increasingly automated. High-throughput technologies demand for automated preparation, storage, manipulation and read-out of a large number of samples in parallel.

On the one hand, high-throughput analyses can provide for improved data statistics by measuring a single condition many times. On the other hand, high-throughput analyses allow examining a large number of conditions. This can be useful when a number of conditions in two or more parameters are analyzed, which leads to a combinatorial explosion of the parameter space. For example, a genome with one thousand genes will result in one million double knock-outs or one billion triple knock-outs. In addition, the discovery of small molecule binding partners of proteins can require a very large number of samples to be analyzed.

Usually, samples are placed in processing systems immediately before being processed by a liquid handling systems or a pipettor. Subsequently, when the treatment is finished, the samples are removed. The samples can for example be delivered to the processing system manually or by a conveyor system. In either case of delivery of the samples, a technician has to pay constant attention to the correct order of the samples. This requires constant surveillance by a technician or user. Any manual step in the process of loading the samples makes the entire analysis process slower and also more error prone.

In high-throughput analysis systems, samples are processed quickly and must be replaced after a short time. The frequency of human interaction is therefore too high for efficient operation of fully automated systems.

SUMMARY OF THE INVENTION

It is an object of the invention to provide a laboratory module that makes the delivery of samples to a processing system easier, faster, more efficient, and more reliable. The invention will now be described by way of example, as shown in the figures.

A laboratory module for storing and providing access to a plurality of samples is disclosed. The laboratory module comprises a plurality of bays comprising a plurality of guiding rails and a plurality of rack tray loading bays for accommodating a plurality of rack trays, and a transport chamber for transporting at least one sample rack to a storage location and for delivering at least one sample rack at predetermined times to a processing system. The transport chamber is adapted to align with any one of the plurality of guiding rails, comprised in the bays and in the rack trays, for placing and moving on the guiding rails the at least one sample rack. The laboratory module further comprises a sensor for sensing the presence and location of a sample rack on any one of the guiding rails, and a barcode scanner that identifies the sample rack for generating and transferring data to the storage device pertaining to the identity of the sample rack and to the location within the laboratory module, and a storage device for storing data pertaining to the identity and location of the sample racks within the laboratory module.

The laboratory module may further comprise a transport module for moving the transport chamber.

A processing bay of the plurality of bays may be accessible by the processing system.

Loading bays of the plurality of bays are accessible from the surroundings for placing thereon or removing therefrom either the at least one sample rack or the at least one rack tray.

At least one of loading bays may comprise a lockable flap.

The transport chamber may comprise a transport interface for moving the at least one sample rack into or out of the transport chamber.

The laboratory module may further comprise a controller for controlling the moving of the sample racks within the laboratory module.

The laboratory module may further comprise at least one storage bay for storing sample racks.

The rack tray may have a locking device for fixation of loaded sample racks in the rack tray.

The laboratory may having means to block user access to a sample rack, which is being processed by the transport chamber. The laboratory may have indicators showing that the laboratory module is blocked.

Damper modules may slow down the sample racks or track trays during loading and may be arranged in a loading bay to avoid contamination of the bay with a sample.

The loading bays may be liquid tight.

At least one of the loading bays can be used as a storage bay

The processing bay may comprise teaching marks for pipetting for calibrating pipetting positions.

Each level of the laboratory module may comprise at least two positioning marks for correct feeding of a loading bay.

A method for processing a plurality of samples in a laboratory module is disclosed. The method comprises the steps of: placing the plurality of samples into at least one sample rack or rack tray, loading the at least one sample rack or rack tray into at least one loading bay of the laboratory module, using a barcode scanner for determining identity of a sample rack, transporting the at least one sample rack to storage bays, delivering predetermined sample racks at predetermined times to a processing bay, wherein a sample rack is moved into or out of a transport chamber of the laboratory module, and using the sensor for determining the presence or location of the sample rack on any one of a plurality of guiding rails comprised in the bays or in the rack tray.

The transporting to storage bays of the plurality of samples may comprise storing information pertaining to the identity of the plurality of samples and to a location within the laboratory module of the plurality of samples.

Teaching marks for pipetting may be used for calibration of a pipette.

Positioning marks may be used for correct feeding of a sample rack.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

The problem is solved by the features as contained in the independent claims, with advantageous embodiments being described by the features as contained in the independent claims. FIG. 1 shows a front view of an aspect of the invention. The laboratory module (10) comprises a plurality of bays (30). The plurality of bays (30) comprises different types of bays (30a, 30b, 30c). The plurality of bays (30) is adapted to accommodate samples, which are to be processed.

Figure 1A:
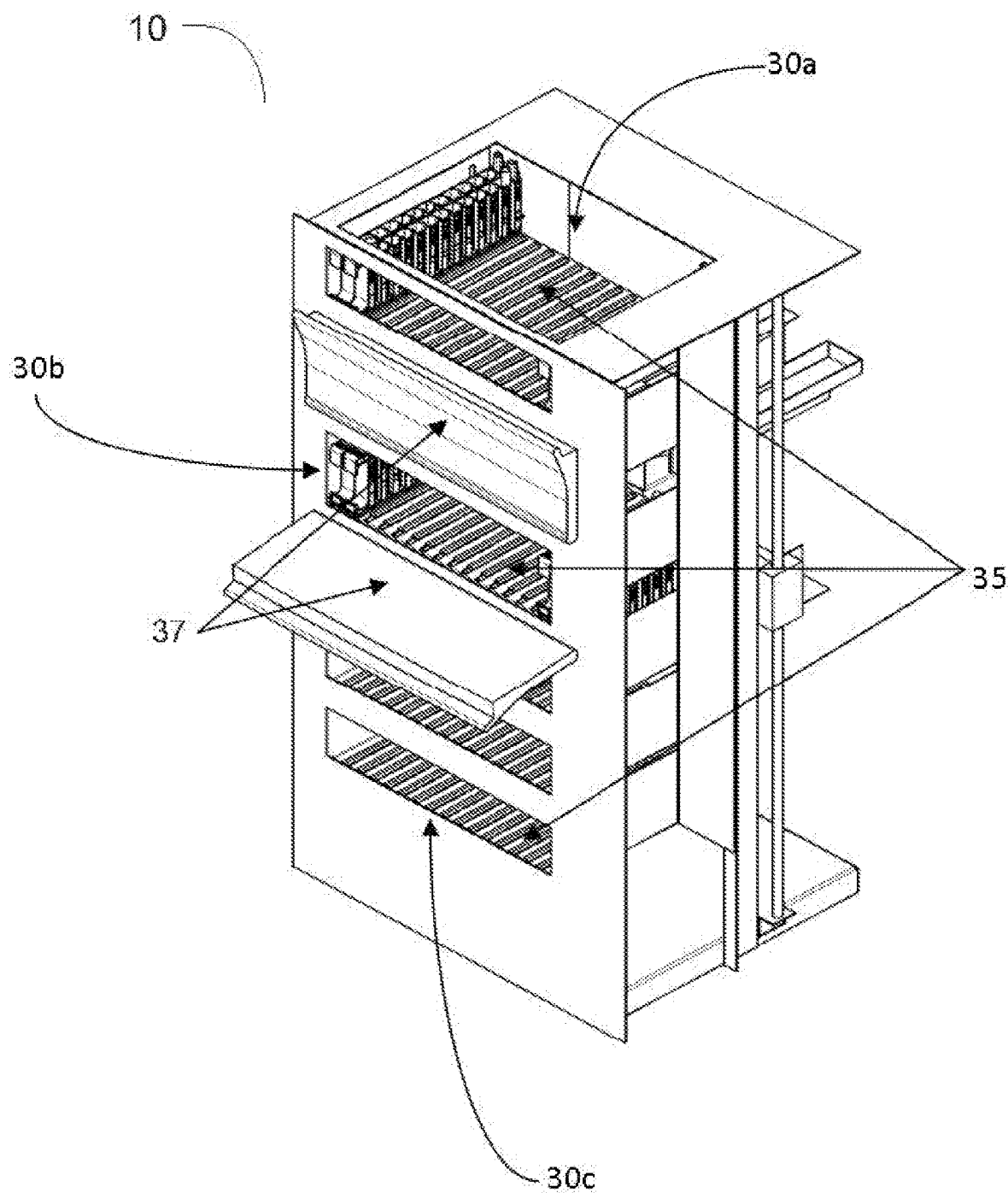
FIG. 1A shows a front perspective view of a first aspect of the laboratory module according to the invention.

The plurality of bays (30) comprises at least one processing bay (30a), which is shown at the top of the laboratory module (10) in FIG. 1A. The at least one processing bay (30a) is accessible from the top by a processing system, e.g. a liquid handling system or a pipettor.

The laboratory module (10) further comprises at least one loading bay (30b). The at least one loading bay (30b) is accessible from the surroundings of the laboratory module (10). The at least one loading bay (30b) comprises a lockable flap (37). A user or other loading means can load the at least one loading bay (30b) through the lockable flaps (37).

The laboratory module (10) further comprises at least one storage bay (30c) for storing samples. The storage bay (30c) is accessible by a transport chamber (described below).

The plurality of bays (30) comprises a plurality of guiding rails (35). Any one of the plurality of guiding rails (35) is adapted to have any one of a plurality of sample racks (40) (see FIG. 3) placed thereon.

Figure 3:
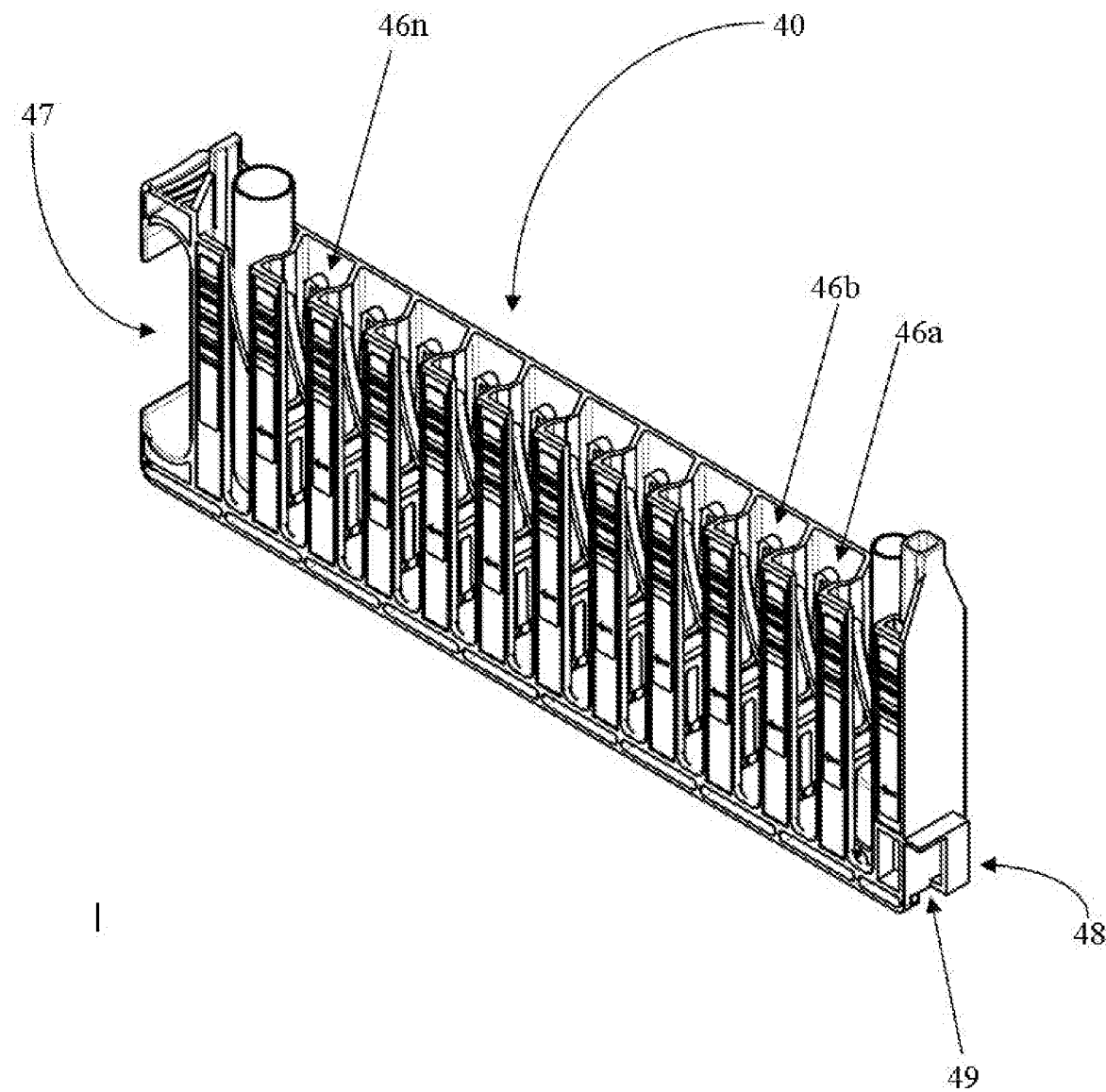
FIG. 3 shows a particular one of the sample racks according to the invention.

FIG. 3 shows an aspect of the plurality of sample racks (40). The sample rack (40) shown in FIG. 3 comprises a plurality of slots (46a, . . . , 46n) for placing samples, and a groove (49) adapted for placing the sample rack (40) onto any one of the plurality of guiding rails (35). The samples may be comprised in a plurality of test tubes (45) placed into the plurality of slots (46a, . . . , 46n).

The sample rack (40) shown in FIG. 3 comprises a handle (47a) adapted for a user or other loading means to load the sample rack (40) onto the at least one loading bay (30b). The sample rack (40) shown in FIG. 3 further comprises a robotic interface (48).

Figure 1B:
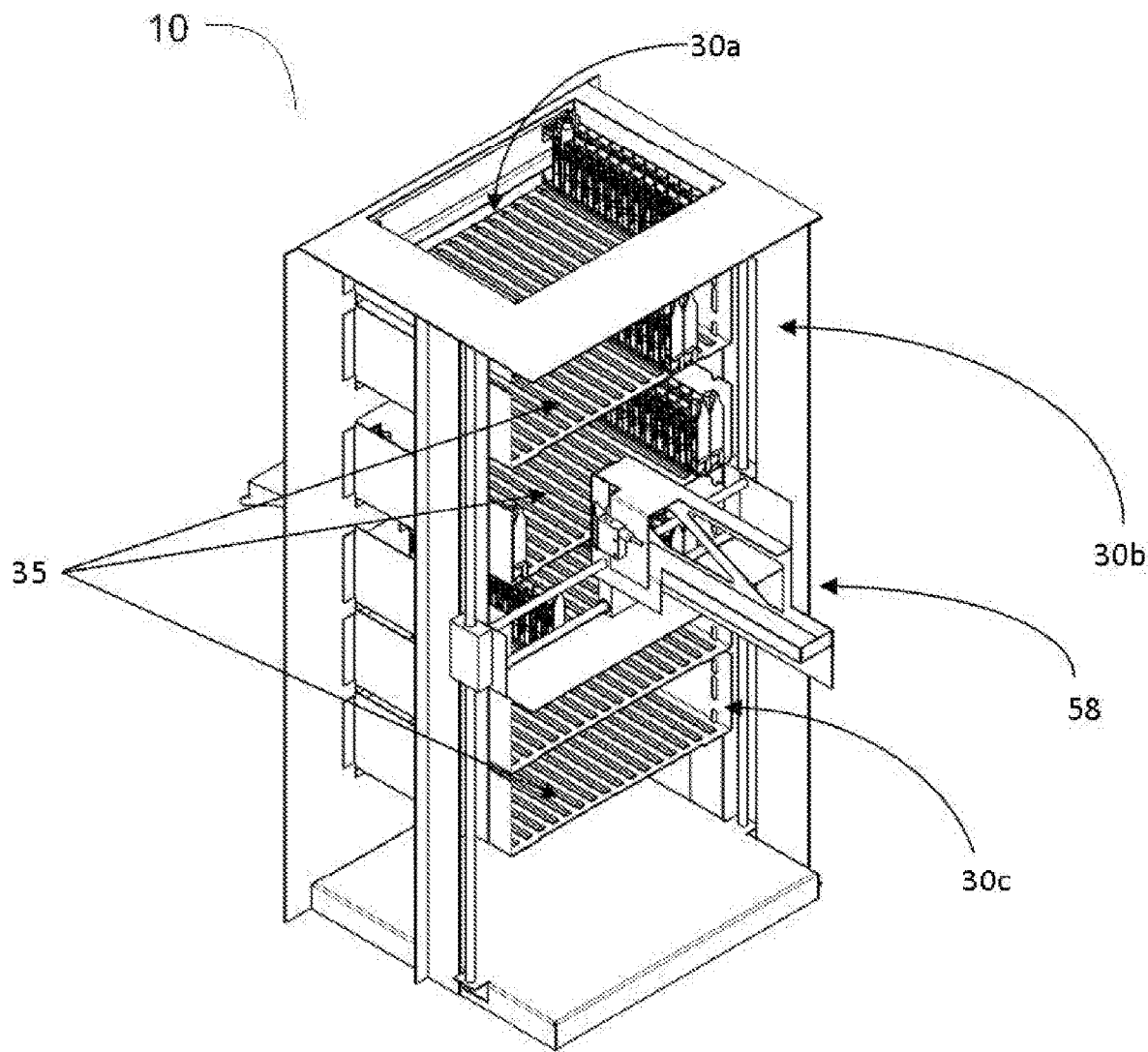
FIG. 1B shows a rear perspective view of the first aspect of the laboratory module according to the invention.

FIG. 1B shows a rear view of the same aspect of the invention. The laboratory module (10) comprises a transport module (50), as shown in FIG. 4, attached to the rear side of the laboratory module (10).

Figure 4:
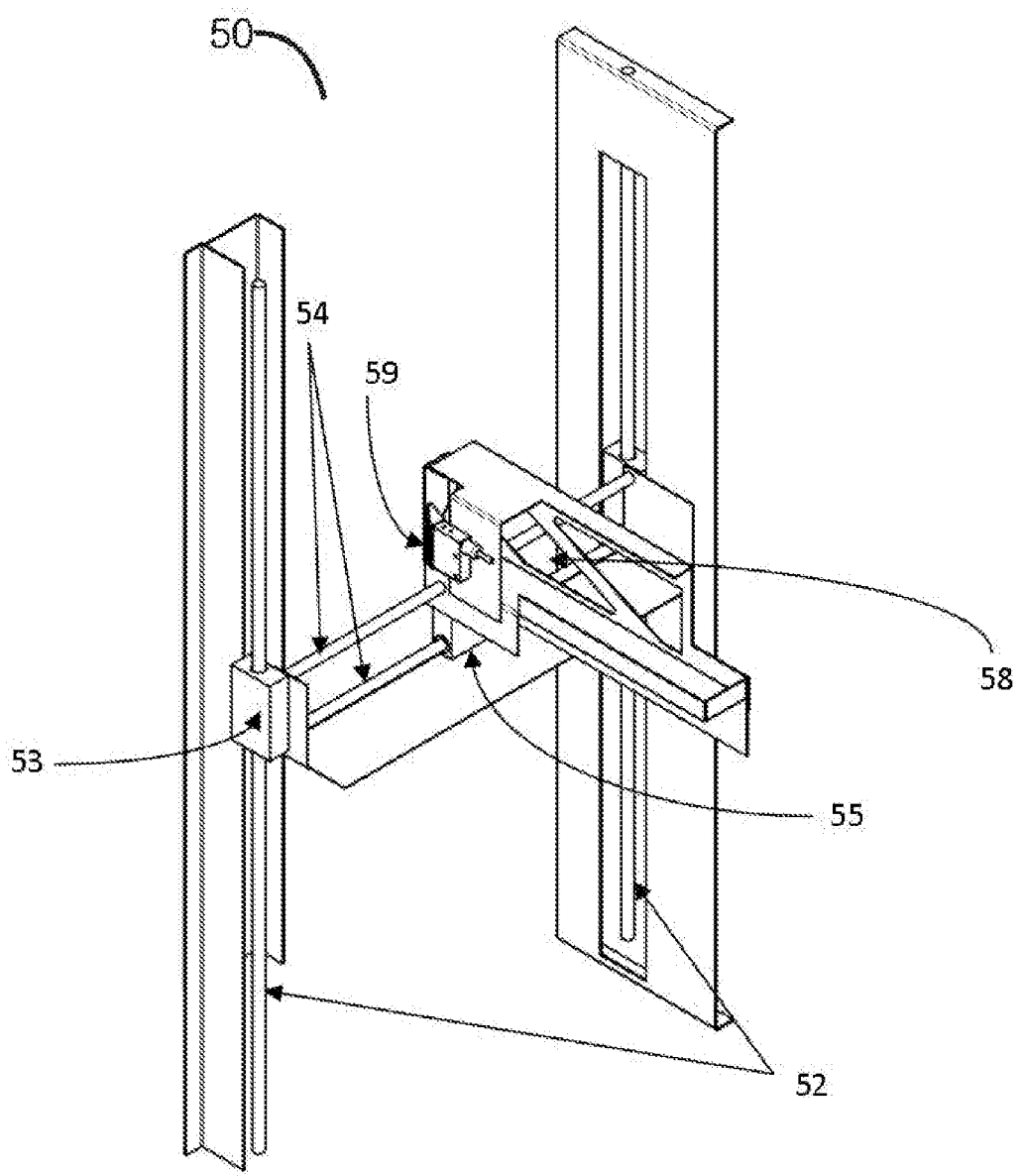
FIG. 4 shows a transport module according to the invention.

FIG. 4 shows the transport module (50). The transport module (50) comprises vertical rails (52). The vertical rails (52) are adapted to have a vertical slider (53) sliding thereon. The vertical slider (53) comprises horizontal rails (54) adapted to have a horizontal slider (55) sliding thereon. The horizontal slider comprises a transport chamber (58). With the help of the vertical slider (53) and the horizontal slider (55) the transport chamber (58) can be moved vertically and horizontally. The transport chamber (58) is adapted to align with any one of the plurality of guiding rails (35).

Figure 5A:
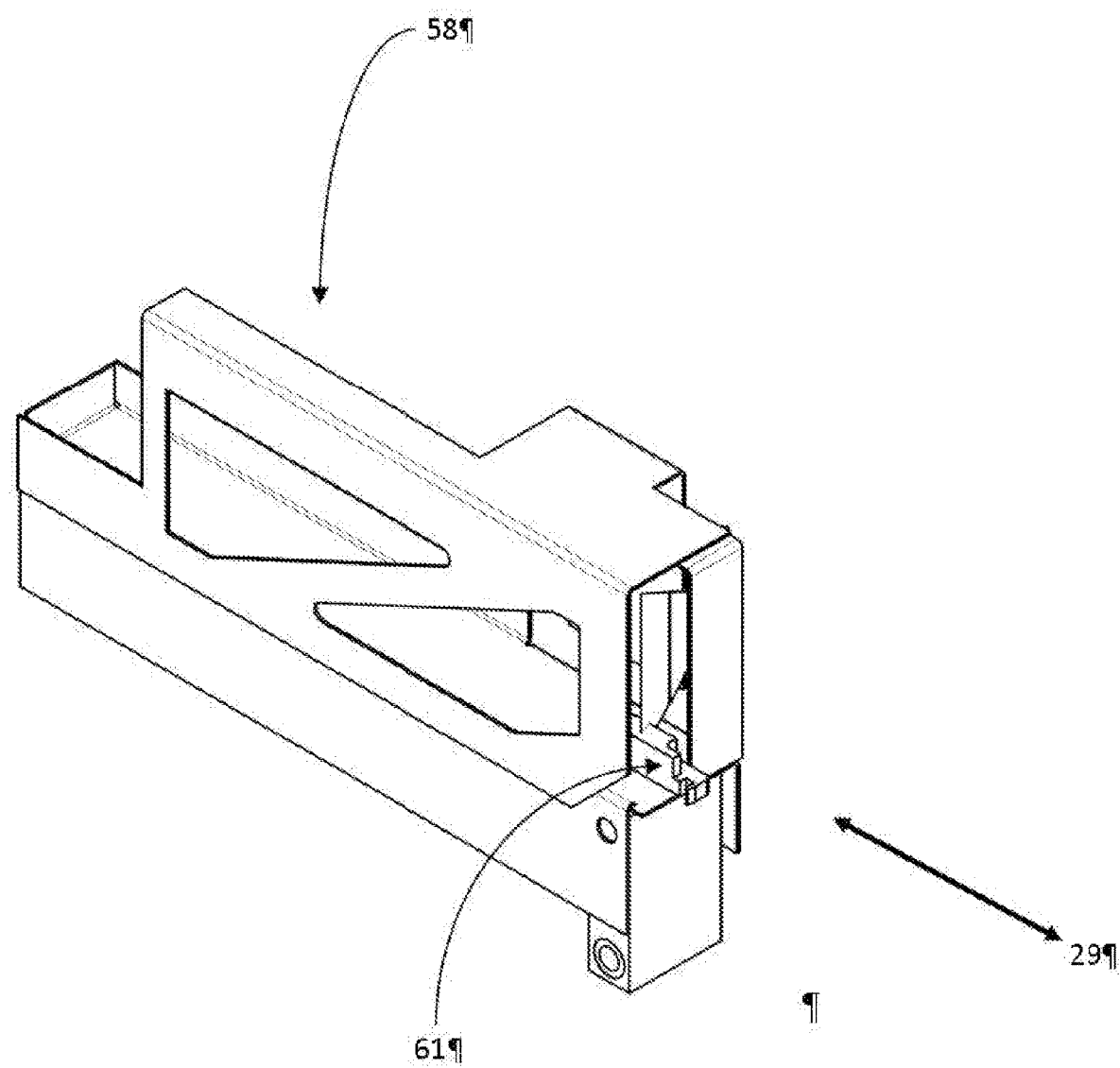
FIG. 5A shows a first aspect of the transport chamber according to the invention.

The transport module (50) also comprises a barcode scanner (59). FIG. 5A shows an enlarged view of the transport chamber (58), shown from a different angle than in FIG. 4. The transport chamber (58) is adapted to accommodate any one of the plurality of sample racks (40). The transport chamber (58) comprises a transport interface (61) for moving any one of the plurality of sample racks (40) into or out of the transport chamber (58). The transport interface (61) is adapted to communicate with the robotic interface (48) of any one of the plurality of sample racks (40). The transport interface (61) is electrically driven.

The transport chamber (58) further comprises a sensor (51) for sensing a presence or absence of the sample rack (40) at a particular position of the laboratory module (10), when the transport module (58) is aligned with a particular one of the guiding rails (35). The sensor may be a photoelectric sensor. Furthermore, capacitive, inductive, or resistive sensors are conceivable.

When a user loads some of the sample rack (40) into the loading bay (35), the user may place sample racks (40) on particular ones of the guiding rails (35), whereas other ones are left empty. The transport chamber (58) may then detect on which ones of the guiding rails (35) there is a sample rack (40). The transport chamber (58) can then move a detected one of the sample racks (40) into the transport chamber (58) and move the sample rack (40) to the processing bay (30a), for example.

By aligning the transport chamber (58) with any one of the guiding rails (35) having a particular one of the plurality of sample racks (40) placed thereon, and by communication of the transport interface (61) with the robotic interface (48) of the particular one of the plurality of sample racks (40), the transport interface (61) can move the particular one of the plurality of sample racks (40) into or out of the transport chamber (58), along a direction as indicated by arrow (29). It is therefore an advantage of the present invention that the plurality of sample racks (40) remains at any moment accessible by the transport chamber (58).

When the particular one of the plurality of sample racks (40) is moved into or out of the transport chamber (58), the barcode scanner (59) identifies the particular one of the plurality of sample racks (40) as well as the samples placed in the slots (46a, ..., 46n) thereof. It is an advantage of the present invention that the samples are identified when accommodated in the transport chamber (58). Thereby, the laboratory module (10) knows at any moment the particular one of the plurality of guiding rails (35) the particular sample is placed on.

The laboratory module (10) comprises a storage device (not shown) for storing scanning data transmitted from the barcode scanner (59). When the particular one of the plurality of the sample racks (40) is moved from a first one of the plurality of guiding rails (35) to a second one of the plurality of guiding rails (35), the storage device stores the scanning data pertaining to the identity of the particular one of the plurality of sample racks (40) and the samples placed in the slots (46a, ..., 46n) thereof. The storage device also stores location data pertaining the identity of the second one of the plurality of guiding rails (35). Thereby, at any moment the laboratory module (10) knows the location of any one the samples. As a result, any one of the samples is accessible at any moment. It is therefore an advantage of the present invention, that a technician or other loading means need not deliver the samples in a predetermined order to the laboratory module (10).

The laboratory module (10) also comprises a controller (not shown). The controller receives scanning data and location data from the storage device. The controller controls at least one first motor (not shown) for driving the vertical slider (53), and at least one second motor (not shown) for driving the horizontal slider (55). The controller also controls the electrical driving of the transport interface (61). By driving the at least one first motor, the at least one second motor, and the transport interface (61), any one of the plurality of sample racks (40) can be efficiently and reliably transported in the transport chamber (58) within the laboratory module (10) from one location to another. It is an advantage of the present invention that the samples can be delivered to the processing system in a predetermined order with the help of the controller.

In one aspect of the invention, a several ones of the plurality of sample racks (40), which have been loaded onto the at least one loading bay (30b), are subsequently transported to the at least one storage bay (30c) by the transport chamber (58). It is an advantage of this aspect of the present invention that a user or another loading means can fill up the at least one storage bay (30b) in one single work step. Thereafter, the laboratory module (10) can operate autonomously and can process, in conjunction with further laboratory equipment like a pipettor or a liquid handling system, a predetermined series of processing steps. The processing steps may involve processing of samples placed on some of the plurality of sample racks (40). It is an advantage of this aspect of the present invention that no further human interaction is required until the series of processing steps is accomplished.

In a further aspect of the invention, the plurality of sample racks (40) comprising samples may be continuously loaded onto the at least one loading bay (30b). The controller controls the transport chamber (58) to move some of the plurality of sample racks (40), placed on the loading bay (30b) and comprising required samples, to the processing bay (30a) for processing. It is an advantage of this aspect of the present invention that high-throughput processing can be achieved.

In a further aspect of the invention, all storage bays (30c) are accessible to a user or other loading means.

In another aspect of the invention, the transport chamber (58) is adapted to move several ones of the plurality of sample racks (40) at any one moment.

Figure 2A:
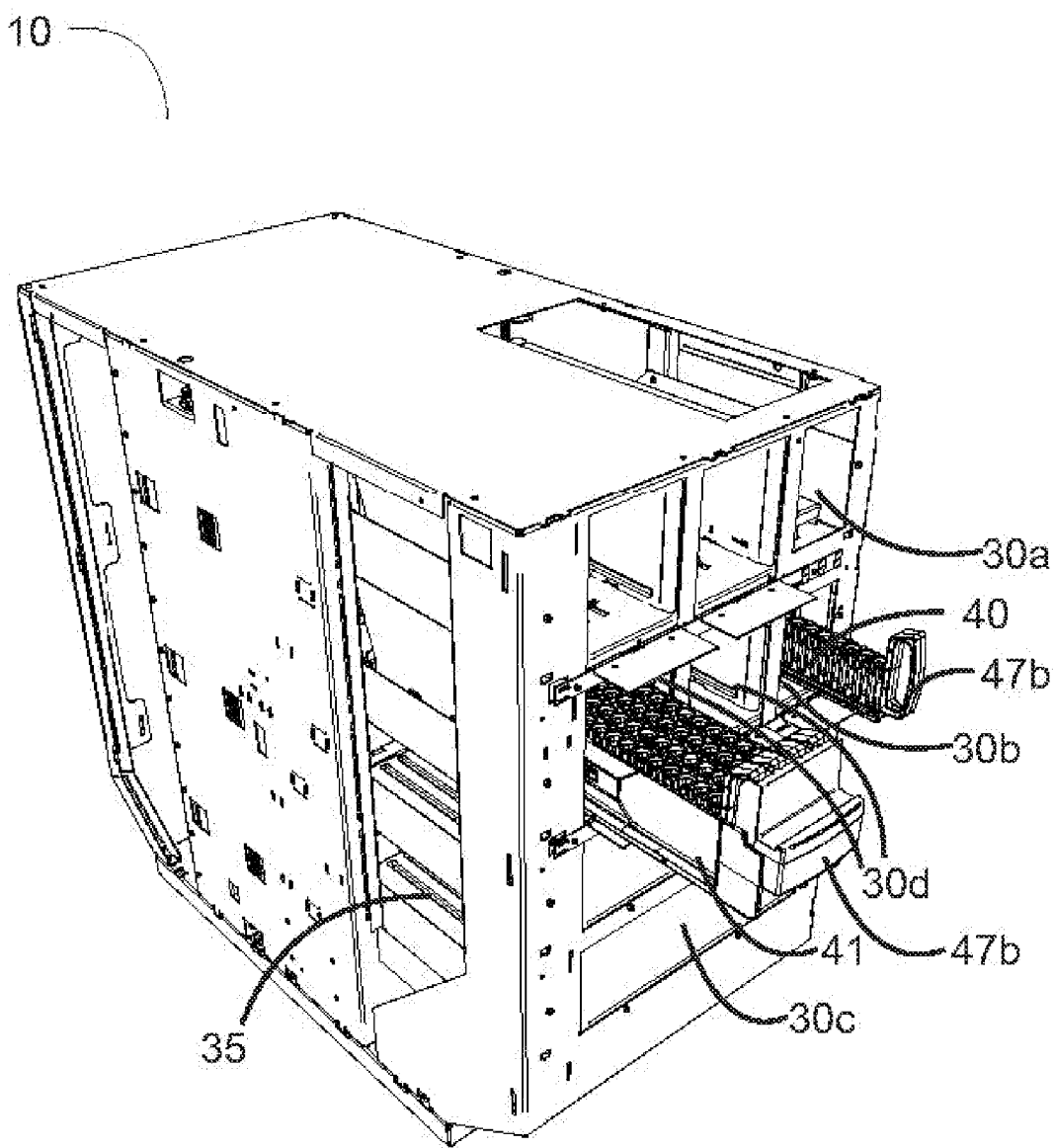
FIG. 2A shows a front perspective view of a second aspect of the laboratory module according to the invention.
Figure 2B:
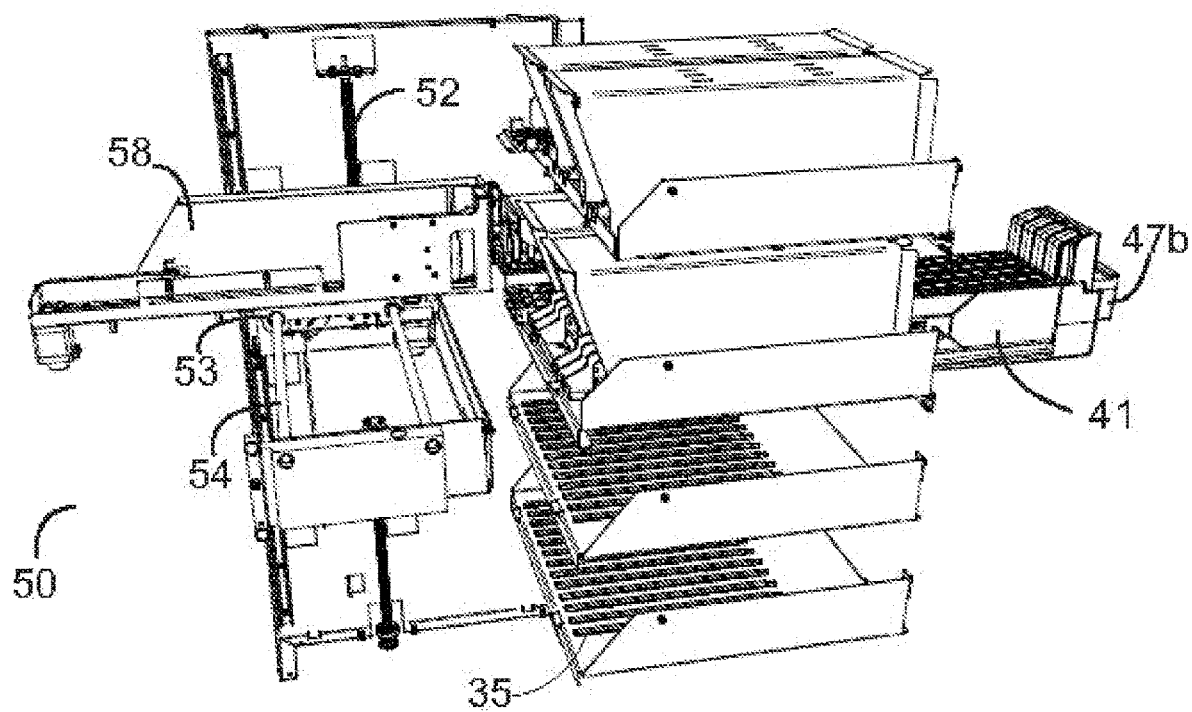
FIG. 2B shows a side view of the interior of the second aspect of the laboratory module.
Figure 2C:
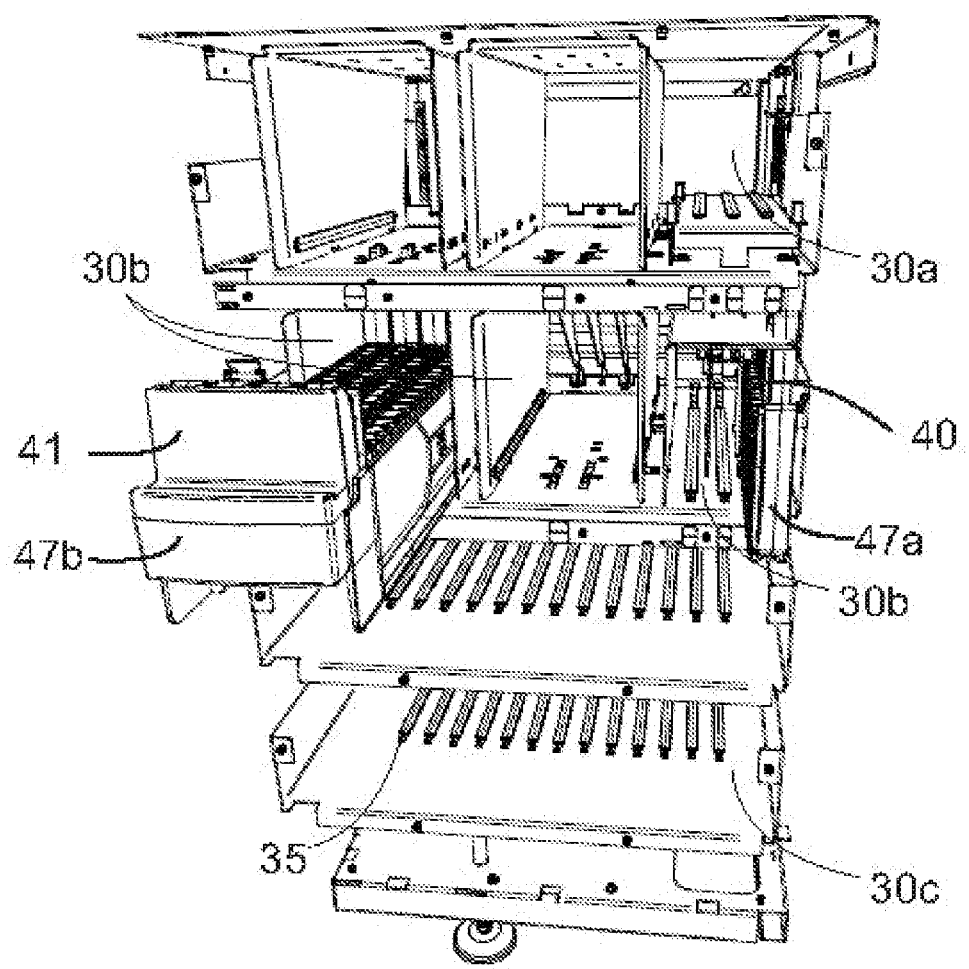
FIG. 2C shows a front view of the interior of the second aspect of the laboratory module.

FIG. 2A shows a front perspective view of a second aspect of the laboratory module (10) according to the invention. FIGS. 2B and 2C are views from different angles of the interior of the same aspect of the laboratory module (10). The laboratory module (10) has the features of the first aspect of the laboratory module (10), shown in FIGS. 1A and 1B. In addition, the laboratory module (10) of the second aspect comprises a rack tray loading bay (30d) for loading a rack tray (41). The rack tray (41) may carry several ones of the sample rack (40). Furthermore, in this aspect the laboratory module (10) comprises several ones of the rack loading bay (30b). The user thereby has more opportunities to load sample racks (40).

Figure 6:
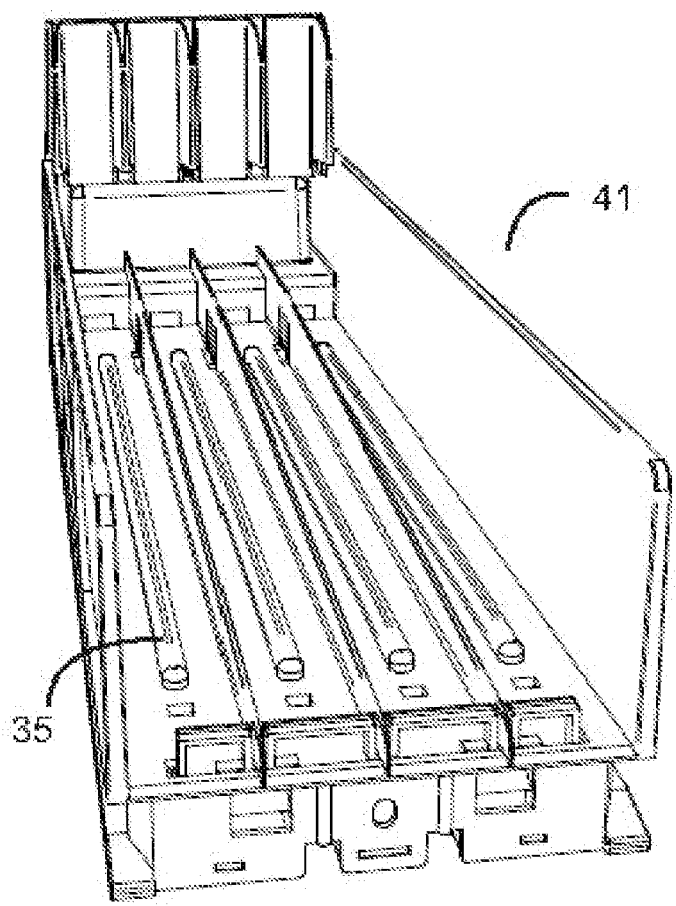
FIG. 6 shows a rack tray according to the invention

One aspect of the rack tray (41) is shown in more detail in FIG. 6. In this aspect, the rack tray (41) can accommodate four of the sample rack (40) by placing them on ones of the guiding rails (35) comprised in the rack tray (41). However, rack trays (41) accommodating other numbers of the sample rack (40) are conceivable as well. The rack tray (41) may, for instance, but not limited thereto, accommodate five or ten of the sample rack (40).

As shown in FIG. 2B, which shows the interior of the laboratory module shown in FIG. 2A from a different angle, a user may place one of the sample racks (40) or the rack tray (41) within the rack tray loading bay (30d) from one side of the laboratory module (10). The transport chamber (58) may access the one of the sample racks (40) or the sample racks (40) carried by the rack tray (41) from the opposite side.

Figure 2D:
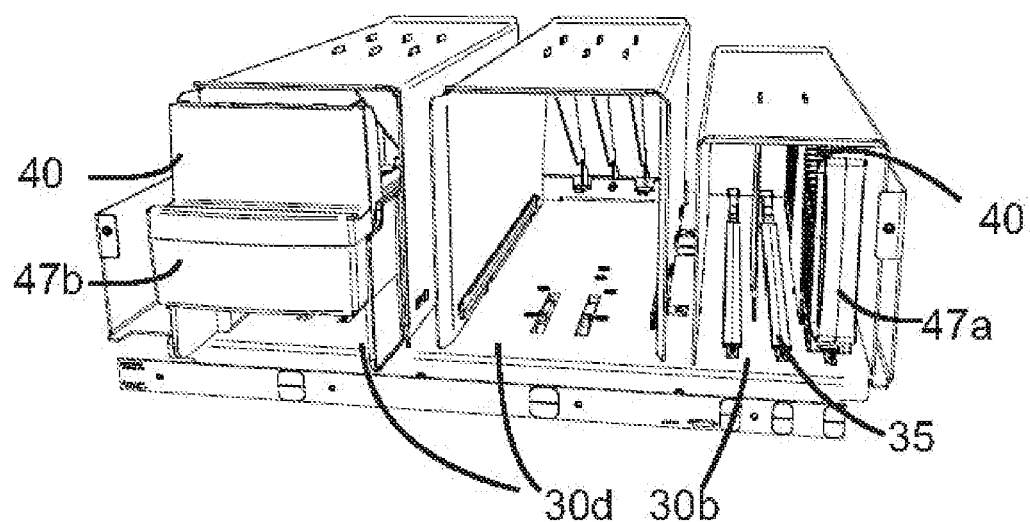
FIG. 2D shows a front view of a component of the interior of the second aspect of the laboratory module.
Figure 2E:
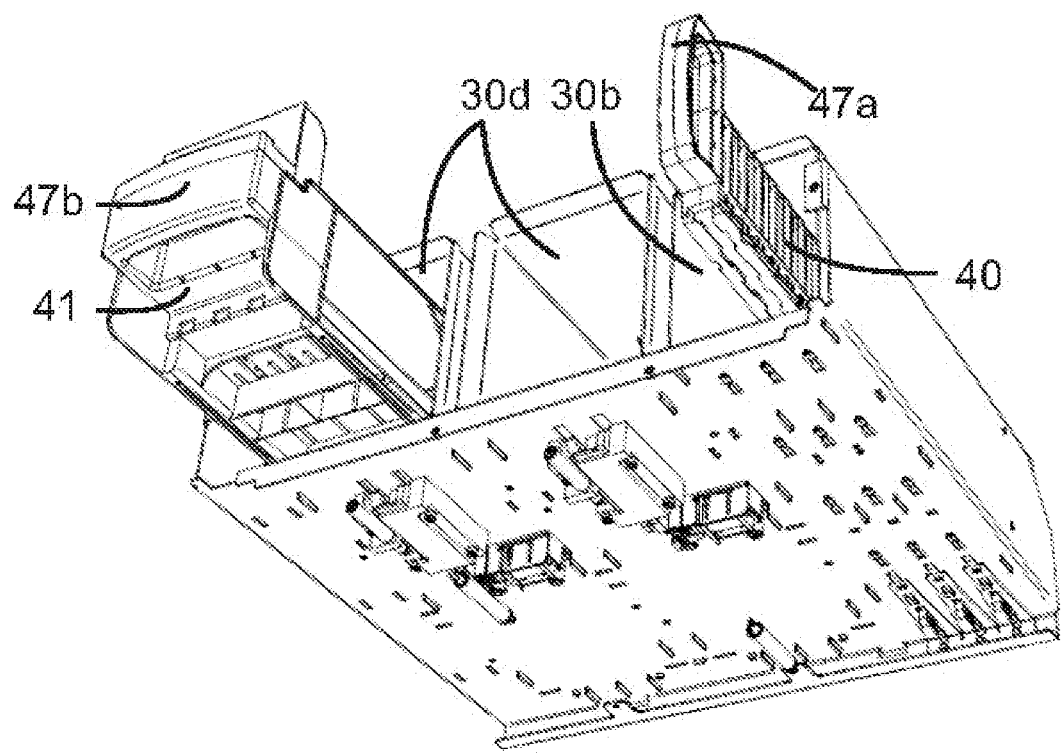
FIG. 2E shows the component shown in FIG. 2D from below.

The laboratory module (10) of the second aspect is assembled from several components, one which is illustrated in FIGS. 2D and 2E. Assembling the laboratory module (10) from components allows for adaptation of the architecture of the laboratory module (10) to the needs of the user.

Figure 5B:
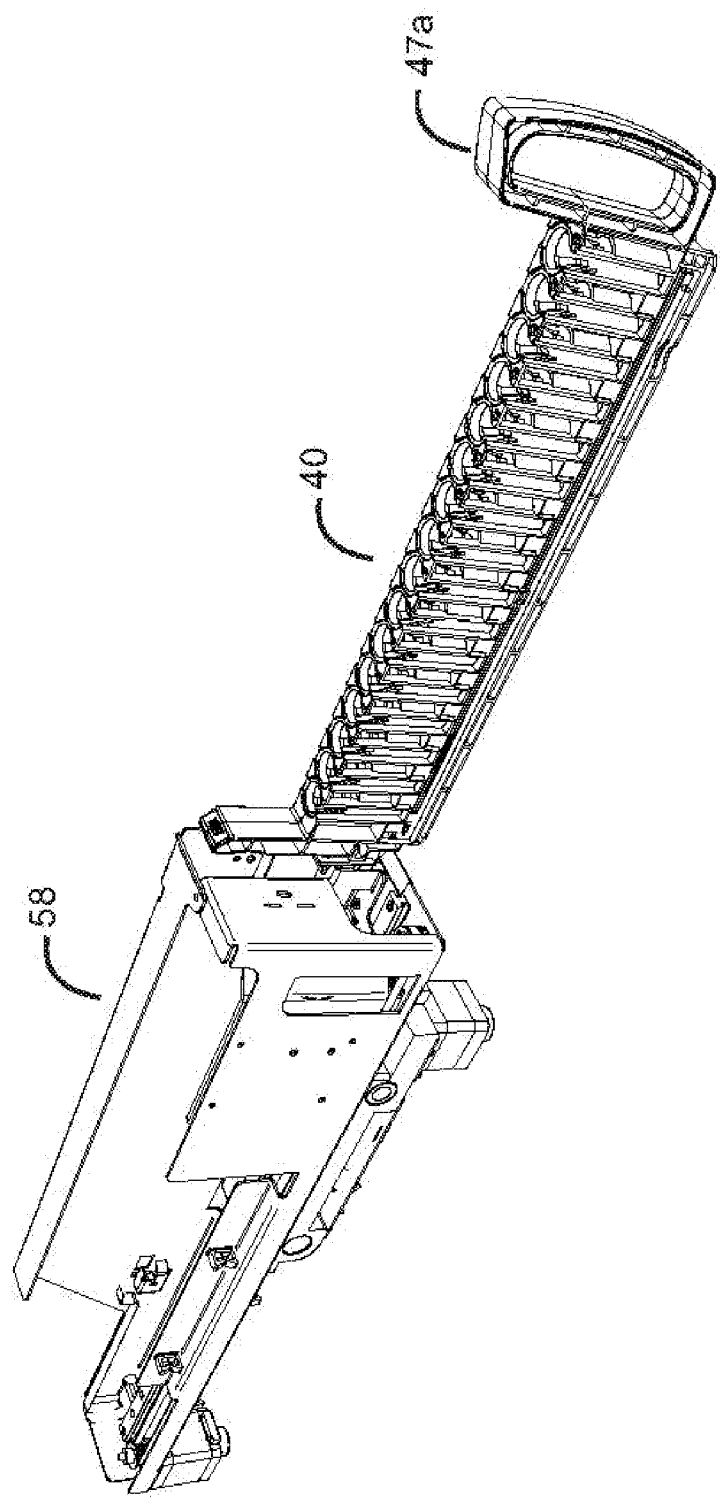
FIG. 5B shows a second aspect of the transport chamber according to the invention with a sample rack outside of the transport chamber.
Figure 5C:
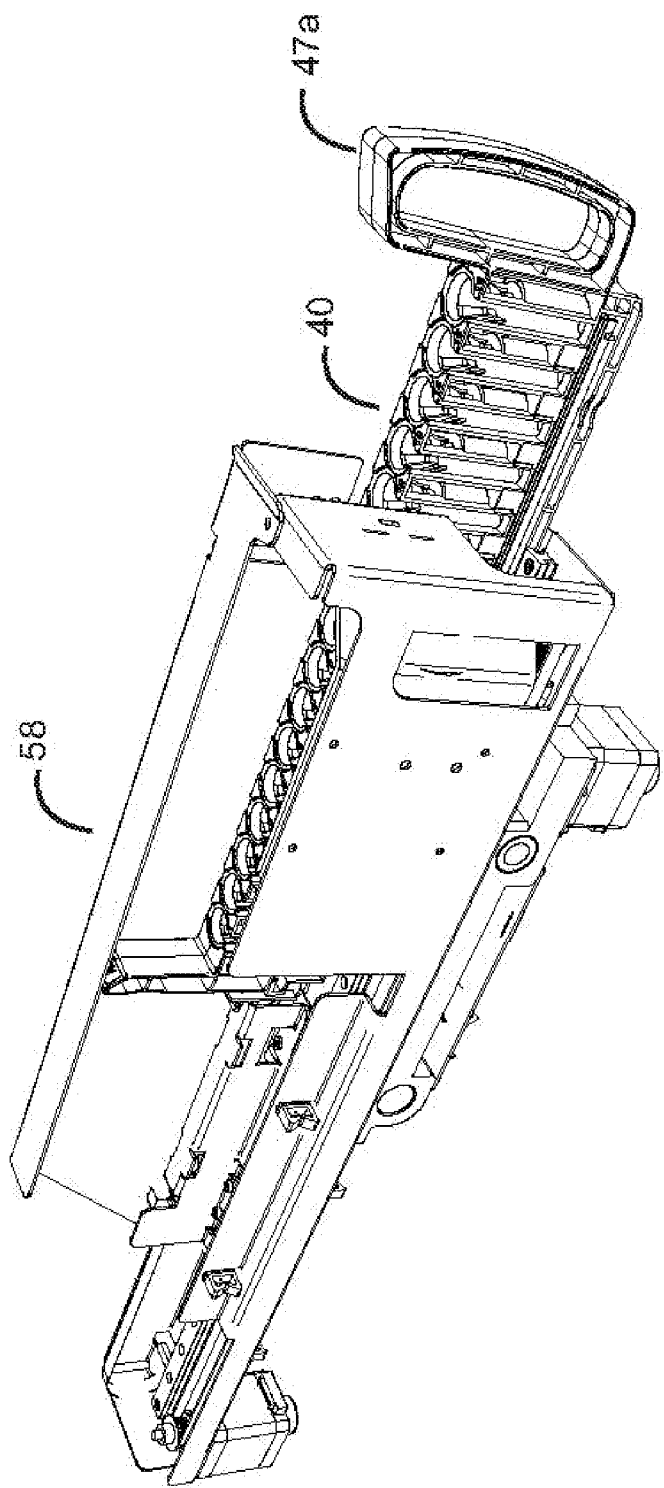
FIG. 5C shows the second aspect of the transport chamber according to the invention with a sample rack in the course of being moved into or out of the transport chamber.
Figure 5D:
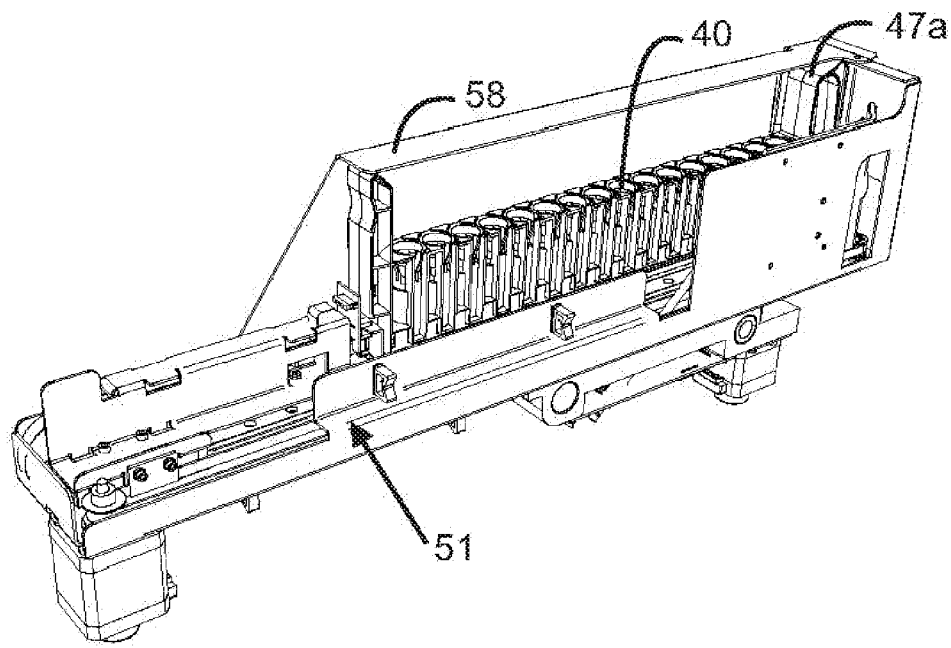
FIG. 5D shows the second aspect of the transport chamber according to the invention with a sample rack in the transport chamber.
Figure 5E:
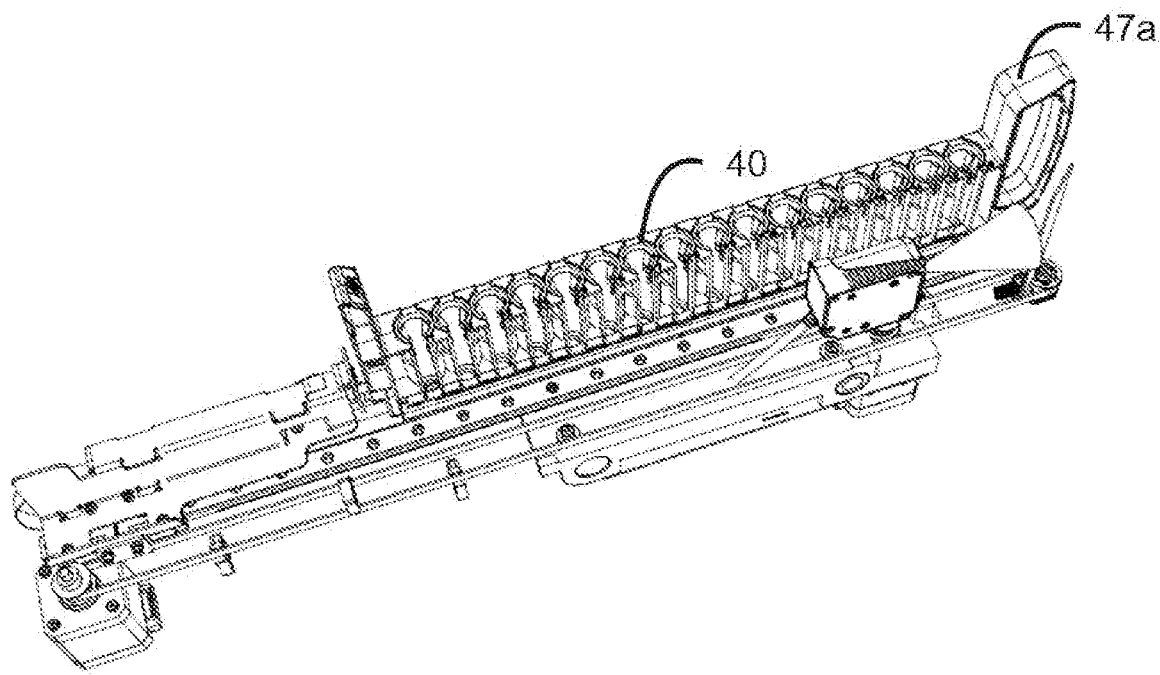
FIG. 5E shows a sample rack with handle according to the invention in more detail.

FIG. 5B shows a second aspect of the transport chamber (58) according to the invention with a sample rack (40) outside of the transport chamber. FIG. 5C shows the same aspect of the invention with a sample rack (40) in the course of being moved into or out of the transport chamber. FIG. 5D shows same aspect of the invention with a sample rack (40) in the transport chamber (58).

LIST OF REFERENCE NUMERALS 10 laboratory module
15 housing support structure
29 arrow
30 bays
30a processing bay 30b rack loading bay
30c rack storage bay
30d rack tray loading bay
35 guiding rails
37 lockable flap
40 racks
41 rack tray
45 test tubes
46a, . . . , 46n slots
47a, 47b handle
48 robotic interface
49 groove
50 transport module
51 sensor
52 vertical rails
3 vertical slider
54 horizontal rails
55 horizontal slider
58 transport chamber
59 barcode scanner
61 transport interface

The invention claimed is:

1. A laboratory apparatus for storing and providing access to a plurality of samples, the laboratory apparatus comprising:
a plurality of bays arranged one upon the other, wherein each bay comprises a plurality of guiding rails holding a plurality of rack trays within each bay with a locking device for fixation of at least one rack in a single bay, wherein
at least one bay is a processing bay arranged in the topmost level of the laboratory apparatus with an opening on its upper side so that it is accessible from the top by a processing system and having an opening on one side so that it is accessible by a transport chamber for placing thereon or removing therefrom the at least one rack, wherein the at least one processing bay comprises teaching marks for calibrating pipetting positions,
at least one bay is a loading bay arranged in the level directly below the at least one processing bay of the laboratory apparatus, having an opening on the same side as the at least one processing bay so that the loading bay is on one side accessible by the transport chamber and an opposite side accessible from surroundings of the laboratory apparatus for direct loading of the at least one rack into the at least one loading bay without interfering with the processing system, and
a transport assembly comprising:
a vertical slider mounted on at least one vertical rail, said vertical slider having at least one horizontal rail;
a horizontal slider mounted on said at least one horizontal rail of said vertical slider; and
a transport chamber mounted on said horizontal slider, the transport chamber being configured to transport the at least one rack tray from a first one of said plurality of bays to a second one of said plurality of bays, wherein the transport chamber comprises
guiding rails configured to align with any one of a plurality of guiding rails of the plurality of bays, and wherein the transport chamber comprises a transport interface for moving the at least one rack into or out of the transport chamber;
a sensor for sensing the presence and location of the at least one rack on any one of the guiding rails; and
a barcode scanner that identifies at least one sample or the at least one rack for generating and transferring data to a storage device for storing data pertaining to the identity and location of at least one sample or the at least one rack within the laboratory apparatus.

2. The laboratory apparatus of claim 1, wherein the laboratory apparatus comprises a transport unit for moving the transport chamber.

3. The laboratory apparatus of claim 1, wherein the plurality of bays further comprises a plurality of loading bays or storage bays.

4. The laboratory apparatus according to claim 1, wherein the at least one loading bay comprises a lockable flap at the side accessible from the surroundings.

5. The laboratory apparatus of claim 1, further comprising a controller for controlling the moving of the at least one sample or the at least one rack within the laboratory module.

6. The laboratory apparatus of claim 1, comprising at least one storage bay for the at least one sample or the at least one rack.

7. The laboratory apparatus of claim 1, wherein the rack tray has a locking device for fixation of loaded at least one sample.

8. The laboratory apparatus of claim 1, comprising means to block user access to the at least one sample or the at least one rack, which is being processed by the transport chamber.

9. The laboratory apparatus of claim 8, comprising indicators showing that the laboratory apparatus is blocked.

10. The laboratory apparatus of claim 1, wherein damper modules slow down the at least one sample or the at least one rack or rack trays during loading and are arranged in a bay to avoid contamination of the bay with a sample.

11. The laboratory apparatus of claim 1, wherein the plurality of bays are liquid tight.

12. The laboratory apparatus of claim 1, wherein said at least one of loading bay can be used as a storage bay.

13. The laboratory apparatus of claim 1, wherein each level of the laboratory apparatus comprises at least two positioning marks for correct feeding of the plurality of bays.

14. A laboratory apparatus for storing and providing access to a plurality of samples, the laboratory apparatus comprising:
a vertical slider mounted on at least one vertical rail, said vertical slider having at least one horizontal rail;
a horizontal slider mounted on said at least one horizontal rail of said vertical slider, and
a transport chamber mounted on said horizontal slider, said transport chamber comprising a transport interface for moving at least one rack into or out of the transport chamber;
a plurality of bays, arranged one upon the other, comprising:
at least one processing bay having teaching marks for calibrating pipetting positions and an opening on one side so that it is accessible by said transport chamber for placing thereon or removing therefrom at least one rack, wherein said at least one processing bay is arranged above all other bays and on top of the laboratory apparatus with an opening on its upper side so that it is accessible from the top by a processing system;
at least one loading bay located directly below the at least one processing bay in the laboratory apparatus, wherein said at least one loading bay has an opening on the same side as the opening on one side of the at least one processing bay so that it is accessible by the transport chamber and another opening on the opposite side accessible from the surroundings for loading the at least one rack into the at least one loading bay; and a plurality of guide rails and a plurality of rack tray bays for accommodating a plurality of rack trays for accommodating at least one rack, wherein the rack trays have a locking device for fixation of at least one rack;

a sensor for sensing the presence and location of at least one rack on any one of the guiding rails; and a barcode scanner that identifies at least one sample in the sensed at least one rack or identifies the sensed at least one rack, the bar code scanner generating and transferring data to a storage device for storing data pertaining to the identity and location of the at least one sample or the at least one rack within the laboratory apparatus;

wherein the transport chamber for transporting the at least one rack from the at least one processing bay or the at least one loading bay to a storage location and for delivering the at least one rack at predetermined times to the processing bay, wherein the transport chamber comprises guide rails aligning with any one of the plurality of guiding rails, comprised in the bays and in the rack trays, for placing and moving on the guiding rails the at least one rack tray.

\* \* \* \* \*